Patented June 3, 1947

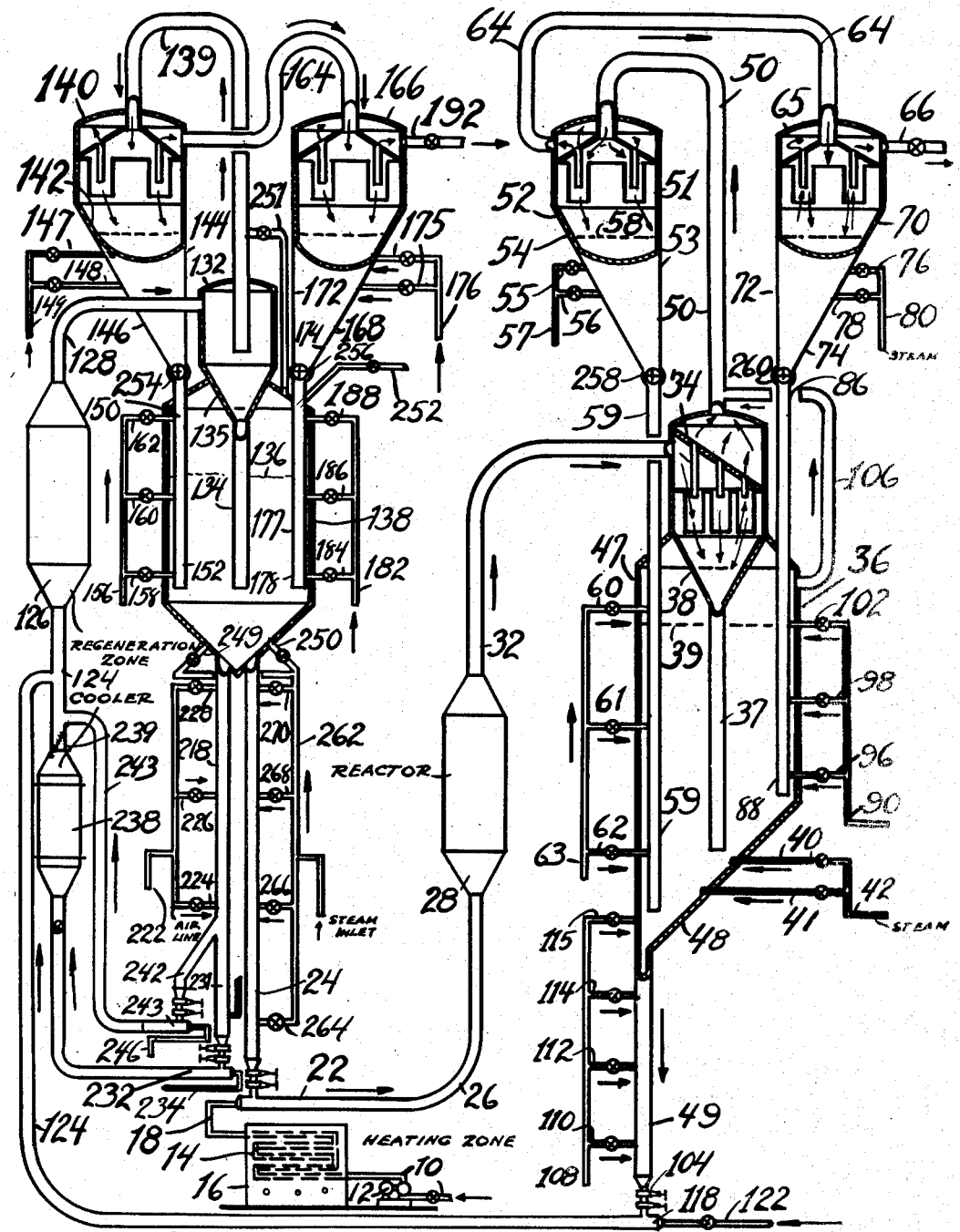

2,421,664

UNITED STATES PATENT OFFICE 2,421,664

CONTACTING FLUIDS WITH SOLID PARTICLES

Charles W. Tyson, Summit, N. J., assignor to Standard Oil Development Company, a corporation of Delaware Application December 28, 1940, Serial No. 372,050

23 Claims. (Cl. 196—52)

This invention relates to contacting finely divided solids with gaseous products and more particularly relates to improvements in the handling of powdered catalyst in catalytic conversions of hydrocarbons to produce more fuels.

In the catalytic conversion of hydrocarbons according to this invention hydrocarbon vapors or gases or mixtures thereof are mixed with powdered catalyst and the catalyst particles are suspended in the hydrocarbon vapors and gases. This suspension is passed through a reaction zone and then to a separator for separating catalyst particles from the reaction products in vapor form. In going through the reaction zone the catalyst particles become coated with carbonaceous deposits or otherwise partially inactivated and it is preferable to regenerate the catalyst particles after each conversion step. The separated catalyst particles are passed to a hopper from which they are sent to a regeneration zone as will be presently described or all or a portion thereof may be passed to the reaction zone. The separated reaction products in vapor form still contain appreciable amounts of more finely divided catalyst particles and in order to remove these particles, the reaction products are passed through a second separator and then to a third separator. From here, the reaction products are further treated as desired as by fractionation to separate desired motor fuels from the remaining reaction products.

The catalyst particles separated from the second and third separation step are preferably introduced into the same hopper into which the catalyst particles from the first separating means are introduced. The catalyst particles coated with carbonaceous deposits are then mixed with air and as a suspension are passed through a regeneration zone for burning off the carbonaceous deposits. The regeneration must be carefully controlled to prevent the temperature from rising too high in the regeneration zone.

The regenerated catalyst particles are preferably separated from the regeneration gases in a plurality of successive separating means and the separated catalyst particles are introduced into a regenerated catalyst hopper. From the regenerated catalyst hopper, the catalyst particles are introduced into a standpipe from which they are fed into a mixing chamber for admixture with the hydrocarbon vapors and gases before they are passed to the reaction zone.

It has been found that the catalyst particles may be mixed with gas to form a fluidized or aerated mass which assumes the properties of a fluid and which may be treated like a fluid. Gas such as steam, light hydrocarbons, nitrogen, carbon dioxide or combustion gases free of oxygen are introduced into the standpipe to provide a fluidized column of catalyst particles. The head of pressure produced by the fluidized catalyst is sufficient to force the hydrocarbon vapors and gases and catalyst particles through the system.

The catalyst particles to be regenerated are also introduced into a standpipe and steam or inert gas is introduced into the standpipe to fluidize the mass before it is passed to the regeneration zone.

Because of the nature of the powdered or finely divided catalyst, it is preferable to construct the hoppers which receive the catalyst particles from the separating means above described with one vertical flat side and an inclined bottom to prevent bridging over of the catalyst particles in the collecting chambers adjacent the outlets thereof. In addition, fluidizing gas may be introduced into the bottom portion of the collecting chambers to fluidize the mass and in this way prevent bridging over of the catalyst particles. Preferably fluidizing gas is also introduced into the bottom portion of the catalyst hoppers to maintain the catalyst particles in fluidized condition so that they may be easily fed to the standpipes associated with the catalyst hoppers.

Another feature of this invention includes the use of return pipes from the collecting chambers associated with the separating means which pipes extend substantially to the bottom of the catalyst hoppers so that the separated catalyst is returned to the catalyst hoppers below the level of the catalyst particles in the hoppers. These return pipes are also preferably connected with gas lines so that a fluidizing gas may be introduced into the return pipes at spaced points along the length thereof to maintain the catalyst particles in fluidized condition so that they flow through the return pipes and into the catalyst hoppers as a fluid. The return pipes are preferably provided with valves to provide shut-off means therefor.

In the drawing, the figure represents one form of apparatus which may be used to practice the invention but it is to be understood that the invention is not limited to the apparatus shown as other apparatus may be used.

Referring now to the drawing, the reference character 10 designates a pipe through which hydrocarbon fluid is passed by means of pump 12. As a feed stock, gas oil, reduced crude or other relatively heavy hydrocarbon fractions may be used. The hydrocarbon fluid to be heated is passed through heating coil 14 in heater 16. The heated hydrocarbon vapors or gases are passed through line 18 into one end of a pipe 22 where they are mixed with fluidized catalyst particles introduced into the pipe 22 from the bottom of a standpipe 24. The fluidizing of the catalyst particles will be later described in greater detail.

In the pipe 22 the catalyst particles are suspended in the hydrocarbon vapors and gases and the suspension is passed through vertical line 26 and into the bottom portion of a reaction zone 28. The reaction zone 28 has a larger diameter than the pipe 26 and due to the enlarged diameter, the velocity of the suspension decreases as it flows through the reaction zone 28. Due to this change in velocity, the hydrocarbon vapors and gases pass through the reaction zone 28 at a faster rate than the catalyst particles and the catalyst concentration in the reaction zone is increased. The hydrocarbon vapors and gases and the catalyst particles are kept in constant motion in the reaction zone 28 and due to this mixing and turbulent condition, there is intimate contact between the catalyst particles and the hydrocarbon fluid and the temperature of the reaction zone is substantially uniform throughout the zone 28.

The hydrocarbon vapors and gases are maintained at a temperature of about 850° F. to 1000° F. and for a sufficient period of time to effect the desired extent of conversion. During the conversion, carbonaceous material is deposited on the catalyst particles and the activity of the catalyst particles is reduced. Preferably the catalyst particles are regenerated after each conversion step and the regeneration will be described in greater detail hereinafter. The reaction products and catalyst particles leaving the top of the reaction zone 28 are passed through line 32 and introduced into a separating means 34 which is shown as a cyclone separator but which may be any suitable separator. The separating means 34 forms the upper part of hopper 36 for receiving the separated catalyst particles as will be presently described. The cyclone separator is of known construction and need not be described in detail. In the separator or separating means 34 catalyst particles are separated from reaction products in vapor form and the catalyst particles drop into the hopper 36.

Extending from the bottom of the separating means 34 is a dip return pipe 37 having a flared upper portion 38 for receiving the separated catalyst particles from the separating means 34. The return pipe 37 extends to the bottom portion of hopper 36 below the level 39 of the catalyst therein. The catalyst particles in hopper 36 are fluidized or aerated by introducing steam or other suitable gas into the hopper by means of lines 40 and 41 communicating with a manifold 42. The catalyst particles in pipe 37 may be fluidized or aerated by introducing steam or other suitable gas thereinto but ordinarily the pipe 37 is of a sufficiently large size to prevent bridging of the catalyst particles and therefore generally no fluidizing step is necessary. If smaller pipes are used, fluidizing should be provided. The catalyst particles fall down into the hopper 36 and the return pipe 37 is sealed. The hopper 36 has a vertical side 47 and a modified conical bottom 48 to reduce any bridging-over of the catalyst particles which may occur whereby the catalyst particles will flow into a standpipe 49 communicating with the bottom portion of the hopper 36. The standpipe 49 will be further described hereinafter.

The reaction products leaving the first separator 34 still contain an appreciable amount of the more finely divided catalyst particles and in order to remove an additional amount of these particles, the reaction products in vapor form are passed through line 50 and into a second separating means 51 which is shown as a cyclone separator but which may be of any suitable construction. In the separating means 51 an additional amount of catalyst particles is separated from the reaction products and the catalyst particles fall into a collecting chamber 52 having a vertical side 53 and an inclined side 54 to prevent bridging-over of the catalyst particles. Steam or other suitable gas is introduced into the chamber 52 through lines 55 and 56 fed by manifold 57 to fluidize or aerate the catalyst particles. The level 58 of the catalyst particles is above the lines 55 and 56.

The separated catalyst particles are withdrawn from the bottom portion of the chamber through return line 59 which extends to the bottom portion of the hopper 36 below the level 39 of the catalyst therein. The catalyst particles in return line 59 are preferably fluidized or aerated by means of steam or other suitable gas introduced into line 59 by means of lines 60, 61 and 62 fed by manifold 63.

The reaction products leaving the top of the separating means 51 still contain an appreciable amount of finely divided catalyst particles and in order to remove substantially all of the remaining catalyst particles, the reaction products from the second separating means 51 are passed through line 64 and into a third separating means 65 which is shown as a cyclone separator but which may be of any suitable construction. The separated reaction products pass overhead through line 66 and are further treated as desired to separate lighter fractions such as motor fuels from heavier hydrocarbon fractions. If desired, a fourth separating means may be used.

The catalyst particles separated in the separating means 65 drop into the collecting chamber 70 which is of substantially the same construction as the collecting chamber 52. The collecting chamber 70 has a vertical side 72 and an inclined side 74. The recovered catalyst particles accumulating in the chamber 70 are preferably fluidized by means of steam or the like introduced by lines 76 and 78 fed by manifold 80. The catalyst particles are passed through line 86 which extends into the catalyst hopper 36 and has its lower portion or lower open end 88 in the lower part of the catalyst hopper 36 below the level 39 of catalyst particles therein to prevent the gases in chamber 36 from by-passing the separating means 65.

To prevent plugging of the catalyst particles in the return pipe 86 it is preferable to maintain the catalyst particles in the return pipe 86 in fluidized condition. The manifold 90 having branch lines 96, 98 and 102 is provided for introducing steam or other suitable gas into the return pipe 86 to fluidize the catalyst particles and enable them to flow into the mass of catalyst in the hopper from the return pipe 86.

The catalyst particles which collect in the hopper 36 have reduced activity because of carbonaceous deposits thereon and in order to reuse the catalyst particles they are regenerated. The catalyst particles from the catalyst hopper 36 are introduced into a second standpipe 49 provided with a throttle valve 104 of suitable construction where they are maintained in fluidized condition by the introduction of steam or other suitable gas by means of a manifold 108 provided with branch lines 110, 112 and 114 for introducing the aerating or fluidizing medium into the standpipe 49 at spaced points. An additional pipe or line 115 may be used for fluidizing the catalyst in hopper 36 at the exit thereof. A line 106 connecting the top of the hopper 36 above the catalyst level 39 with the line 50 leaving separating means 34 is provided to carry away the gas used for aeration without losing entrained catalyst particles.

The catalyst particles in a fluidized condition are fed into a pipe 118 where they are mixed with a portion of the regeneration gas or other suitable gas introduced into the pipe 118 by line 122. The suspension of catalyst particles is passed through line 124 and introduced into the bottom portion of a regeneration zone 126. During passage through the regeneration zone, it is necessary to control the temperature of regeneration to prevent overheating of the catalyst particles. One method of controlling this temperature will be described hereinafter in greater detail. Other means of controlling the temperature may be used as for example indirect heat exchangers.

The mixture of catalyst particles to be regenerated and the air or other oxidizing medium introduced into the regeneration zone as will be later described in greater detail is passed upwardly through the regeneration zone 126. The regeneration zone has a larger diameter than the diameter of the pipe 124 and due to the larger diameter, the velocity of the suspension is decreased. In passing through the enlarged regeneration zone 126 the regenerating gases pass therethrough at a greater velocity than the catalyst particles. In the regeneration zone 126 the particles are maintained in a turbulent condition and in this way the temperature throughout the regeneration zone is substantially uniform.

In regenerating catalyst particles the temperature during regeneration should be kept below about 1200° F. and when clay particles are being regenerated the temperature is preferably not higher than about 1000° F. The regenerated catalyst particles and regenerating gases leave the top of the regeneration zone 126 through line 128 and are passed to a separating means 132 which is shown as a cyclone separator but which may be of any suitable construction for separating solid particles from gases. The separating means 132 is provided with a return pipe 134 having a flared upper end 135. The pipe 134 extends below the level 136 of the regenerated catalyst in hopper 138.

Ordinarily the pipe 134 will have a sufficiently large diameter to prevent bridging of the catalyst particles therein and no fluidizing step is necessary. However, if smaller return pipes are used, fluidizing of the catalyst particles in the return pipes is preferred. The separated regenerated catalyst particles are introduced into the regenerated catalyst hopper 138 by means of return pipe 134. The regenerating gases passing overhead through line 139 still contain an appreciable amount of finer catalyst particles and in order to remove additional amounts of catalyst particles, the regenerating gases are passed to a second separating means 140 which is shown as a cyclone separator but which may be of any suitable construction.

The separated catalyst particles are dropped into a collecting chamber 142 which is similar in construction to the other collecting chambers 52 and 70. The collecting chamber 142 has a vertical side 144 and an inclined side 146. The catalyst particles in chamber 142 are preferably aerated or fluidized by means of lines 147 and 148 fed by manifold 149. The regenerated catalyst particles are withdrawn from the bottom of the chamber 142 and passed through a return pipe 150 which extends into the regenerated catalyst hopper 138 and has its lower open end 152 positioned in the bottom portion of the regenerated catalyst hopper 138 below the level 136 of the catalyst particles therein. The construction of the collecting chamber 142 is adapted to prevent bridging-over of the catalyst particles at the outlet end of the collecting chamber 142.

In order to prevent plugging of the returning catalyst in the return pipe 150, steam or other suitable gas may be passed through manifold 156 and branch lines 158, 160 and 162 for introducing steam or the like into the return pipe 150 at spaced points.

The regenerating gases leaving the separating means 140 still contain appreciable amounts of finer catalyst particles and in order to remove additional quantities of catalyst particles, these regenerating gases are passed through line 164 into another separating means 166 which is shown as a cyclone separator but which may be of any suitable construction. The separated catalyst particles are dropped into a collecting chamber 168 which is similar in construction to the collecting chambers 142, 70 and 52 above described. The collecting chamber 168 has a vertical side 172 and an inclined side 174. As above described, this particular construction prevents any bridging-over of the catalyst particles at the outlet end of the collecting chamber 168. Steam or the like is preferably introduced into chamber 168 by means of lines 175 having a manifold 176 to aerate or fluidize the catalyst particles in chamber 168.

The separated catalyst particles are passed through a return pipe 177 which extends into the regenerated catalyst hopper and below the level of the mass of catalyst particles in the hopper 138. The lower open end 178 of the pipe 177 is positioned near the bottom of the hopper 138. To prevent plugging of the catalyst particles in the return pipe 177 suitable gas such as steam or the like may be injected into the pipe at spaced intervals. For this purpose a manifold 182 is provided having branch lines 184, 186 and 188 for introducing a fluidizing medium into the pipe.

The regenerating gases leaving the separating means 166 still contain finely divided catalyst and these catalyst particles are preferably removed by an electrical precipitator (not shown) but the precipitator may be omitted. If an electrical precipitator is used, the separated catalyst particles are returned to the hopper 138 in any suitable manner. The regeneration gases are passed from the system through line 192. A portion or all of the regeneration gases may be introduced into pipe 118 by line 122 as above referred to.

While fluidizing of the catalyst particles in the return pipes has been disclosed, in certain instances, as for example where short return pipes are used, the fluidizing step may be omitted.

Returning now to the regeneration of the catalyst particles and to the control of the temperature during regeneration, a third column or standpipe 218 is provided which communicates with the bottom of the regenerated catalyst hopper 138 and which receives regenerated catalyst from the hopper. The regenerated catalyst in the standpipe 218 is maintained in a fluidized condition by introduction of air or other suitable fluidizing medium. A manifold 222 is provided having branch lines 224, 226 and 228 which communicate with the interior of the standpipe 218 at spaced points for introducing a fluidizing medium. The bottom of the standpipe 218 is forked to produce two streams of catalyst. One of these streams is passed through tubular member 231 and introduced into a pipe 232 into which air is introduced by means of line 234 and the suspension of regenerated hot catalyst in air is passed through line 232 and cooler 238 for reducing the temperature of the catalyst particles. The cooled catalyst particles are then passed through line 239 where they are mixed with hot catalyst particles to be regenerated passing through line 124. The mixing of the cooled regenerated catalyst with the catalyst to be regenerated reduces the temperature a proper amount so that the catalyst to be regenerated may be passed through the regeneration zone 126 without fear of having the temperature rise too high during regeneration.

The other stream of regenerated catalyst, passing through tubular member 242 is introduced into pipe 243 and mixed with air introduced through line 246 and this mixture is passed through line 243. If the catalyst particles after having passed through the cooler 238 are at too low a temperature, some of the hot regenerated catalyst from line 243 is mixed with the cooled catalyst passing through line 239 to bring the temperature of the catalyst particles to be regenerated to the proper temperature for regeneration. Valves are provided in lines 231 and 242 to provide for controlling the amounts of catalyst passing through the lines to control the temperature of the catalyst particles passing to the regeneration zone 126.

Steam may be introduced into the bottom portion of the regenerated catalyst hopper 138 through lines 249 and 250 to assist in maintaining the catalyst particles in fluidized condition. A line 251 is provided between the top of regenerated catalyst hopper 138 and gas outlet line 139 from separating means 132 to carry away the gas used in aeration or fluidizing of the hopper bottoms. This pipe is similar in function to pipe 106 previously described.

Fresh catalyst may be introduced into the regenerated catalyst hopper through line 252.

All of the chambers and hoppers 36, 52, 70, 142, 168 preferably have modified conical bottoms. Hopper 138 has a conical shaped bottom.

The standpipes 24, 49 and 218 comprising forked tubular members 231 and 242 are provided with throttle valves for controlling the rate of flow from the standpipes.

By having the return pipes dip under the surface of the catalyst in the catalyst hoppers, the return pipes are normally sealed during operation without the use of valves. In the operation of the process there are pressure drops through the separating means and due to the difference in pressure in each hopper and in the return pipes from the second and third separating means, the level in these return pipes must remain sufficiently above the level in the hoppers to overcome the difference in pressure. For this reason sufficiently long return pipes must be provided to permit the difference in level.

Preferably valves 254, 256, 258 and 260 are provided in secondary and tertiary return pipes 150, 177, 59 and 86, respectively, to provide means for closing off the return pipes when the process is being started or if, for some reason or other, the return pipes or any one of them becomes emptied during the operation. By closing valves 254, 256, 258 and 260 the catalyst particles build up in the cyclone chambers and the return pipes may then be filled and used as in normal operation.

Standpipe 24 is fluidized by injecting a suitable gas such as steam, nitrogen, carbon dioxide, combustion gases substantially free of oxygen, or the like into the standpipe at spaced points along its length. For example a manifold 262 is provided having branch lines 264, 266, 268 and 270 for feeding a fluidizing medium to the standpipe.

The number of fluidizing jets shown in the drawing and described herein may be varied and more or less of them may be used to effect the desired fluidizing and aeration of the particles in the standpipes, pipes, chambers, etc.

For example, other processes may be used, such as, polymerization, hydrogenation, dehydrogenation, isomerization, alkylation, reforming with or without hydrogen, Fischer synthesis, clay treating for removing undesired constituents, sulfur removal from hydrocarbons, chemical reactions such as oxidation, reduction, chlorination, nitration, etc.

While a hydrocarbon catalytic cracking process has been described in connection with the dip return pipes and the system is particularly adapted for catalytic cracking of hydrocarbons, it is to be understood that the system including the return pipes may be used in other processes where solids are separated from gases and the solids are returned to a hopper. In such other processes the solid particles in the return pipes are preferably fluidized. In such other processes the collected solid particles in the hoppers or collecting chambers may be fluidized to facilitate flow thereof from the hoppers and chambers.

In fluidizing standpipes 24, 49 and 218 sufficient fluidizing gas is used to provide a flowable or fluid mass but the amount of fluidizing gas is kept at a minimum to get the highest density of the material in the standpipes.

While one form of the invention has been shown, it is to be understood that this is by way of illustration only and that various changes and modifications may be made without departing from the spirit of the invention.

What is claimed is:

1. In the contacting of powdered solid particles and fluids, wherein the powdered solid particles and fluid are passed through a reaction zone and maintained therein for a time sufficient to effect a desired reaction and the solid particles are separated from reaction products in a plurality of separation stages and the separated solid particles are collected in a closed hopper, the step of returning the solid particles separated in each of said stages as separate confined streams to said hopper below the level of solid particles therein.

2. In the catalytic conversion of hydrocarbons using a catalyst in finely divided form, wherein hydrocarbon vapors and catalyst particles are mixed and passed through a reaction zone to effect the desired extent of conversion and the fouled catalyst particles are separated from the reaction products in at least one stage and the separated catalyst particles are collected in a hopper, the step of returning the catalyst particles separated in at least one stage to said hopper below the level of catalyst particles therein.

3. A method according to claim 2, wherein the separated catalyst particles are collected in a chamber before being returned to said hopper and the particles in at least the bottom portion of said chamber are maintained in a fluidized condition to facilitate removal from said chamber.

4. A method according to claim 2, wherein the catalyst particles in at least the bottom portion of said hopper are maintained in fluidized condition to facilitate removal therefrom.

5. A method according to claim 2, wherein the catalyst particles separated from the reaction products from each of the stages are returned to said hopper as individual streams below the level of catalyst particles therein.

6. A method of catalytically converting hydrocarbons which comprises mixing hydrocarbon vapors and gases with catalyst particles in finely divided form, passing the mixture through a reaction zone maintained under conversion conditions, separating fouled catalyst particles from reaction products in a plurality of stages, returning catalyst particles separated in the first stage as a stream to the bottom portion of a hopper below the level of catalyst particles therein, passing the separated reaction products from the first stage to a second stage for further separation of catalyst particles therefrom, collecting the separated catalyst particles from the second stage in a chamber and then returning them as a separate stream to the bottom portion of said hopper below the level of catalyst particles therein, passing the separated reaction products from said second stage to a third separating stage to separate additional quantities of catalyst particles therefrom, collecting the separated catalyst particles from said third stage in a second chamber, passing the separated catalyst particles as a separate stream from said second chamber to said hopper below the level of catalyst particles therein and further treating the reaction products to separate desired products therefrom.

7. A method according to claim 6, wherein certain of the streams of catalyst returning to said hopper are fluidized to facilitate return to said hopper.

8. A method according to claim 6, wherein at least the bottom portions of catalyst particles in said chambers are fluidized to facilitate flow therefrom.

9. A method according to claim 6, wherein at least the bottom portion of catalyst particles in said hopper is fluidized to facilitate removal thereof from said hopper.

10. A method of treating fluids and finely divided particles which comprises passing a gaseous fluid and powdered solid particles through a reaction zone, separating solid particles from gaseous fluid in a plurality of stages in series, returning solid particles separated in the first stage as a separate confined stream to the bottom portion of a closed hopper below the level of solid particles therein, passing the separated fluids from the first stage to a second stage for further separation of solid particles therefrom, returning the separated solid particles from the second stage as a separate confined stream to the bottom portion of said hopper below the level of solid particles therein, passing the separated fluids from said second stage to a third separating stage to separate additional quantities of solid particles therefrom, returning the separated solid particles from said third separating stage as a separate confined stream to said hopper below the level of solid particles therein.

11. A method according to claim 1, wherein the solid particles separated in at least one stage are returned to said hopper by means of a pipe and a fluidizing medium is introduced into said pipe to maintain the solid particles in fluidized form whereby they flow through said pipe and into said hopper and a gaseous fluid is withdrawn from the top portion of said hopper and returned to the fluid leaving the first separating zone.

12. In the contacting of powdered solids and gaseous fluid wherein the powdered solids and gaseous fluid are passed through a contacting zone and maintained therein for a desired contacting time and powdered solids are then separated from gaseous fluid in a plurality of separation stages in series so that separated gaseous fluid from the first separation stage passes to the second separation stage and the separated powdered solids are collected in a closed hopper, the step of returning powdered solids from two of said separation stages as separate confined streams to said hopper below the level of powdered solids therein to provide a seal between certain of said separation stages.

13. In the contacting of powdered solids and gaseous fluid wherein the powdered solids are passed through a contacting zone and maintained therein for the desired time and powdered solids are then separated from gaseous fluid in a plurality of separation stages comprising cyclone separators in series whereby due to pressure drops through said separation stages different pressures are produced in said separation stages, the step of returning powdered solids from at least the second of said separation stages as a separate confined stream to a closed hopper below the level of powdered solids therein to provide a seal between certain of said separation stages.

14. A method according to claim 13 wherein the powdered solids separated in the second separation stage are returned to said hopper through a pipe and the powdered solids are maintained in a fluidized condition as they flow through said pipe and into said hopper.

15. A method according to claim 13 wherein the powdered solids are fouled catalyst particles which are regenerated by burning with air and regenerated catalyst particles are separated from the regeneration gases and passed to said hopper.

16. A method of catalytically converting hydrocarbons which comprises mixing hydrocarbon vapors and gases with catalyst particles in finely divided form, passing the mixture through a reaction zone maintained under conversion conditions, separating fouled catalyst particles from reaction products in a plurality of stages, returning catalyst particles separated in the first stage to a hopper, passing the separated reaction products from the first stage to a second stage for further separation of catalyst particles therefrom, returning the separated catalyst particles from the second stage as a separate stream to the bottom portion of said hopper below the level of catalyst particles therein, passing the separated reaction products from said second stage to a third separating stage to separate additional quantities of catalyst particles therefrom, returning the separated catalyst particles from said third stage as a separate stream to said hopper below the level of catalyst particles therein and further treating the reaction products to separate desired products therefrom.

17. A method according to claim 13 wherein the powdered solids in at least one separation stage are returned to said closed hopper through a pipe wherein the powdered solids are maintained in a fluidized condition and gaseous fluid is withdrawn from the top portion of said hopper and returned to the fluid leaving said first separation zone.

18. An apparatus of the character described including a plurality of separating means arranged in series for separating suspended solid particles from a gaseous fluid, a hopper associated with said separating means for receiving solid particles separated in said separating means, each separating means being provided with a return pipe extending to near the bottom portion of said hopper for returning separated solid particles to said hopper below the level of the accumulated solid particles therein and means for withdrawing separated gaseous fluid from each of said separating means, one of said return pipes having a valve.

19. An apparatus of the character described including a plurality of separating means arranged in series for separating suspended solid particles from a gaseous fluid, a hopper associated with said separating means for receiving solid particles separated in said separating means, each separating means being provided with a return pipe extending to near the bottom portion of said hopper for returning separated solid particles to said hopper below the level of the accumulated solid particles therein and means for withdrawing separated gaseous fluid from each of said separating means.

20. An apparatus according to claim 19 wherein said return pipe associated with the second separating means is provided with means for fluidizing the powdered solids passing therethrough.

21. An apparatus according to claim 19 wherein a return pipe is provided for connecting the top portion of the hopper with the outlet line from the first separating means for removing gaseous fluid from said hopper.

22. In the contacting of finely divided solid particles and gaseous fluids wherein the finely divided solid particles and gaseous fluid are introduced into a contacting zone and maintained therein for a time sufficient to effect the desired contacting and solid particles are then separated from the gaseous fluid after the desired contacting and returned to a hopper wherein they are maintained in a fluidized condition, the step of returning separated solid particles to said hopper below the level of fluidized solid particles therein.

23. In the contacting of finely divided solid particles and gaseous fluids, wherein the finely divided solid particles and gaseous fluid are introduced into a reaction zone and maintained therein for a time sufficient to effect a desired reaction and vaporous reaction products pass overhead with entrained solid particles and entrained solid particles are then separated from said vaporous reaction products and collected in a hopper wherein they are maintained in a fluidized condition, the step of returning separated solid particles to said hopper below the level of fluidized solid particles therein.

CHARLES W. TYSON.

REFERENCES CITED

The following references are of record in the file of this patent:

UNITED STATES PATENTS

| Number | Name | Date |
|---|---|---|
| 1,497,751 | Hopkinson | June 17, 1924 |
| 1,799,858 | Miller | Apr. 7, 1931 |
| 2,231,424 | Huppke | Feb. 11, 1941 |
| 2,239,801 | Voorhees | Apr. 29, 1941 |
| 2,273,075 | Weems | Feb. 17, 1942 |

FOREIGN PATENTS

| Number | Country | Date |
|---|---|---|
| 533,037 | Germany | Sept. 8, 1931 |